United States Patent [19]
Okuhara et al.

[11] 3,709,802
[45] Jan. 9, 1973

[54] LIQUID FOOD DECOLORIZATION

[75] Inventors: Akira Okuhara, Takashi Nakajima, both of Noda-shi; Nobuo Saito, Nagareyama-shi, all of Japan

[73] Assignee: Kikkoman Shoyu Co., Ltd., Noda-shi, Japan

[22] Filed: March 9, 1970

[21] Appl. No.: 17,632

[52] U.S. Cl........204/137 R, 204/180 R, 204/180 P, 99/105, 204/139
[51] Int. Cl..............................B01k 1/00, B01k 3/10
[58] Field of Search.......204/130, 180 R, 180 P, 151, 204/72, 137, 260, 139; 127/11, 10, 53, 54; 99/6, 105

[56] References Cited

UNITED STATES PATENTS

| | | | |
|---|---|---|---|
| 688,102 | 12/1901 | Lincoln et al. | 204/137 R X |
| 1,132,058 | 3/1915 | Williams | 204/137 R X |
| 1,189,023 | 6/1916 | Watson | 204/137 R X |
| 1,199,457 | 9/1916 | Ellithorp, Jr. | 204/180 R |
| 1,397,562 | 11/1921 | Thatcher | 204/130 X |
| 1,577,669 | 3/1926 | Wolf et al. | 204/180 P |
| 1,889,779 | 12/1932 | Ebert et al. | 204/180 R X |
| 2,193,323 | 3/1940 | Nitzchke et al. | 204/260 X |
| 2,228,264 | 1/1941 | Freedley | 204/260 X |
| 2,363,386 | 11/1944 | Bock | 204/260 X |

FOREIGN PATENTS OR APPLICATIONS

| | | | |
|---|---|---|---|
| 210,444 | 1925 | Great Britain | 204/137 R |
| 356,703 | 9/1931 | Great Britain | 204/137 R |

Primary Examiner—John H. Mack
Assistant Examiner—A. C. Prescott
Attorney—Cushman, Darby & Cushman

[57] ABSTRACT

A liquid food such as soy sauce, and a fruit juice, is electrolytically reduced in an electrolytic cell comprising an anode isolated from the liquid food by an ion-permeable membrane, at least one metallic net or perforated plate cathode and a vessel for encasing the anode and the cathode by applying a potential between the electrode, while filling the liquid food in the vessel. Melanoidins contained in the liquid food is decolorized thereby.

8 Claims, 5 Drawing Figures

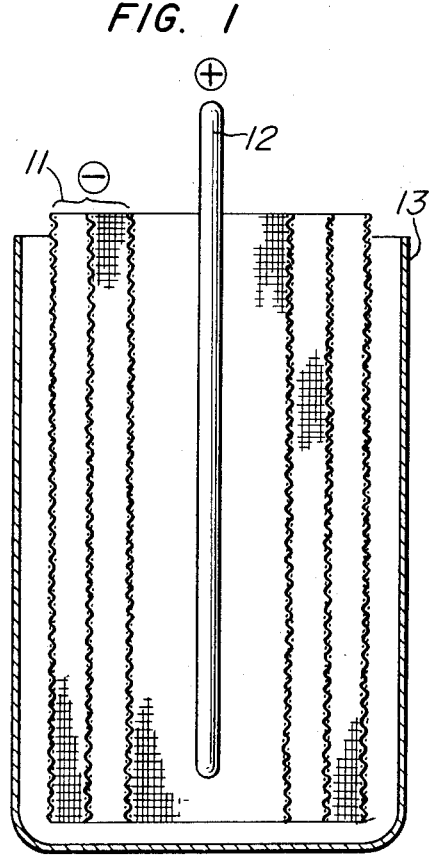
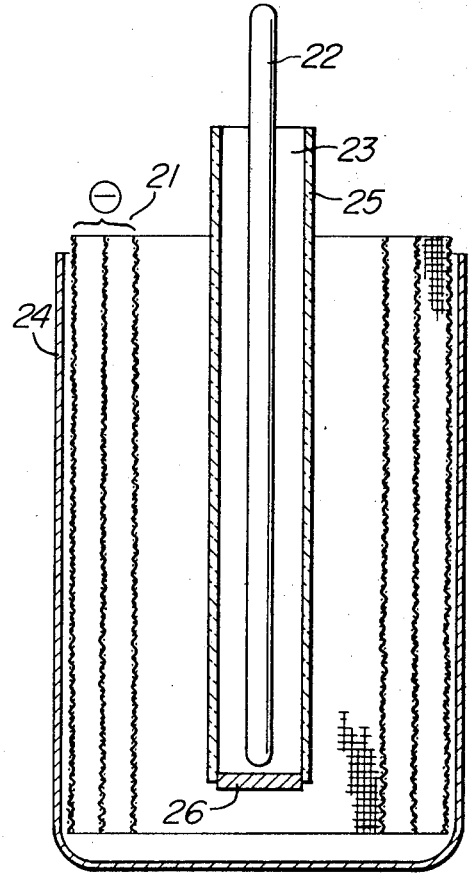

LIQUID FOOD DECOLORIZATION

This invention relates to a method for improving a quality of a food and further maintaining the quality of the food, and more particularly to a method for decolorizing melanoidins formed during the storage of a liquid food and controlling formation of the melanoidins.

The term "liquid food" herein used means not only foods consisting only of liquids, for example, soy sauce, sauce, amino acid solution, "Mirin," etc., but also foods consisting of liquids and solids, for example, fruit juice, a certain kinds of sauces, etc.

The term "mirin" herein used means a sweet kind of "sake" prepared by adding glutinous rice to distilled alcohol obtained from starch as a raw material and digesting the resulting admixture with the mold rice prepared by culturing the microorganism *Aspergillus* on steamed rice.

The term "decolorizing" herein used means not only decolorization of melanoidins already formed, but also control of formation of the melanoidins and maintenance of the liquid food at the desired degree of color.

When a liquid food is preserved, particularly when the liquid food is preserved in a storing facility such as a storing tank for a long period of time, deteriorations in appearance and tastes due to color change of food ingredients and quality change of food ingredients by oxidation are a great problem.

Heretofore, anti-oxidants and color change inhibitors have been used to prevent such deteriorations. However, there are few antioxidants that have a satisfactory effect upon the deteriorations. Even is they have a satisfactory effect, they have an undesirable taste or a toxicity, or have a good effect at the beginning but have an adverse effect after a substantially long period of time. Thus, satisfactory antioxidants have not been available.

As regards the color change inhibitor, particularly, inhibitors for preventing the browning reaction without an oxidation only sulfurous acid and cystein have been known. It is well known that the action of these inhibitors to prevent the browning reaction to brown is due to formation of a chemically stable compound by combination of the inhibitor with such carbonyl compounds as sugars, etc. However, these inhibitors give also an undesirable influence to the taste. Moreover, sulfurous acid is so toxic that its use is not preferable.

Therefore, the decolorization of melanoidins formed during the preparation or storage is limited to an adsorption decolorization method based on the use of activated carbon, Japanese acid clay, decolorizing resin or other adsorbents, and any other methods have not been used almost at all. However, these adsorbents are liable to adsorb the taste itself of the food other than the melanoidins, or a larger amount of the adsorbent is necessary to use, or separation of the adsorbent is difficult to effect after the adsorbing operation, or regenerating operation is necessary for repeated use of these adsorbents. Thus, the use of the adsorbents has such disadvantages as much labor and expenses.

Furthermore, the adsorbents are not applicable to a liquid food containing solids at all, and thus the oxidation of the liquid food cannot be prevented at all.

It is an object of the present invention to provide a method for preventing formation of melanoidins during the preparation and storage of a liquid food.

A further object of the present invention is to provide a method for decolorizing melanoidins formed in a liquid food by reduction.

In order to accomplish said objects, the present inventors have made various researches and studies, and have found that a color of a liquid food, for example, a coloring matter consisting mainly of the so-called melanoidins, which is presumed to form owing to the amino-carbonyl reactions as a factor for changing a color of soy sauce, amino acid solution, "Mirin," fruit juice, etc., can be readily eliminated by applying an electrolytic reduction to the liquid food.

Furthermore, the present inventors have found that it is possible to preserve a liquid food for a long period of time without forming any melanoidins by slowly carrying out the reduction over a prolonged period of time.

According to the present invention, the decolorization can be attained economically at a low cost without any fear of deteriorating the food taste or toxicity. The present method can be carried out by placing an anode and a cathode in contact with a liquid food to be decolorized and applying an electrical potential to the electrodes through the liquid food. The anode may be used in a direct contact with the liquid food, but it is preferable to provide an anode chamber for isolating the anode from the liquid food by means of an ion-permeable material, for example, an agar bridge containing ions, asbestos sheet, ion exchange membrane, etc. as an isolating membrane. In the anode chamber, an aqueous solution of such an electrolyte as potassium chloride, sodium chloride, citric acid, tartaric acid or acetic acid is placed together with the anode.

Generally, it is well known that the discharge voltage of hydrogen ion depends upon the respective kind of a cathode. Such metals as aluminum, silver, iron and copper have higher discharge voltages of hydrogen ion and can satisfactorily decolorize the melanoidins of such liquid foods as soy sauce. In the case of a concentrated solution of a liquid food, for example, soy sauce, the voltage is in an almost linear relation with the current, and by increasing the cathode current, the decolorization can be rapidly effected, while discharging the hydrogen. These metals are used as a cathode in the present invention. On the other hand, a hardly-ionizable material, for example, platinum or carbon is used as an anode on account of its less consumption.

In the case that carbon or platinum is used as the anode, an electromotive force ranging from 1.5 to 2.0 V develops when such a readily-ionizable metal as aluminum, iron or copper is used as the cathode, and the cathode of the electrolytical cell is liable to undergo corrosion if the applied electric potential is less than said electromotive force, and electrons are released from the cathode material and pass to the anode through the electrolytic cell and the circuit outside the electrolytic cell. Therefore, when the reduction is carried out desirably under a low potential less than the electromotive force, it is advantageous to use the similar, readily-ionizable metal, for example, the same metal as that of the cathode, as the anode material. The decolorization by reduction under a low voltage is economical in view of the quantity of electricity (volt × ampere).

It is desirable from an economical point of view that the applied potential be as low as possible, but the applied potential depends upon an electrical resistance of a liquid food to be decolorized, particularly upon a resistance due to the ion permeability of the isolating membrane, but generally ranges from about 1 volt to several tens volts. That is to say, in the case that there is a considerably high resistance between these two electrodes, no current passes between the electrodes unless a potential of several tens volt or higher is applied therebetween, and the rate of decolorization is made low. Particularly, in the case that contamination of the liquid food with cations is undesirable, it is necessary to make as small as possible the area of the ion-permeable, isolating membrane interposed between the anode chamber and the cathode chamber. In such a case, a current flow is decreased under a low voltage, and thus the electrolytic reduction must be carried out, while applying a considerably high potential between the cathode and the anode.

The desirable decolorization can be usually attained by passing the current between the two electrodes for a few to several tens hours, but depends upon the kind of a liquid food and the amount of melanoidins contained in the liquid food.

In the case that a liquid food is preserved for a long period of time and its quality is kept constant from the deterioration, it is possible to pass a current intermittently or continuously between the anode and the cathode. The decolorization can be efficiently carried out by stirring or allowing the liquid food to move within the cell.

When a chloride is used as an electrolyte for an anolyte, a chlorine gas is generated. The generated chlorine gas may be discharged to atmosphere as such, but can be readily reduced to hydrogen chloride by placing it in contact with an activated carbon at the normal temperature or above. Therefore, the chlorine gas can be readily removed from the system by conducting the electrolysis while reducing it with the activated carbon.

The pH of a liquid food within the cathode chamber is gradually increased during the electrolytic reduction. When a slight increase to pH is undesirable, the pH can be adjusted by adding a suitable acid to the liquid food, when desired. For example, in the case of soy sauce, chlorine ions and hydrogen ions are consumed at the anode and the cathode respectively, and thus the pH is adjusted by adding hydrochloric acid thereto.

Preferable embodiment of the present invention is that the electrolytic reduction is carried out by using a double or multiple cathode provided by inserting at least one metallic net or perforated plate cathode between the anode and the cathode. In order to carry out an effective reduction, a larger surface area of a cathode per current is desirable, but an attempt to increase the surface area, for example, by spirally winding a metal plate cathode around the anode is not effective, because an even current density cannot be obtained. However, it is found that a reduction efficiency can be increased by disposing a metallic net or perforated plate as a double or multiple cathode to increase the surface area of the cathode. Furthermore, the use of metallic net cathodes is particularly effective for electrolytic reduction of a liquid food with a high viscosity or in a slurry state or a liquid food not suitable for stirring.

Such a metallic net or perforated plate cathode is used also to facilitate the dispersion of the liquid food at the cathode surface and make uniform a distribution of current density at the cathode surface. In the case of a large-scale cell, it is impossible to keep uniform the distribution of current density at the cathode surface only by the use of the metallic net or perforated plate cathode. In such a case, the uneven distribution of the current density due to a locational relation between the anode and the cathode, as well as a locational relation between the cathodes themselves can be made by adjusting the voltages applied to the individual cathodes and consequently making uniform the current per unit area. In this manner, the reduction efficiency can be increased. In that case, the voltages applied to the respective cathodes are adjusted by means of resistors.

The use of metallic net or perforated plate cathodes ensures an increase in the surface area of the cathodes and keep the current density effectively uniform, whereby the decolorization or electrolytic reduction of the melanoidins can be efficiently carried out.

When a plurality of metallic net or perforated plate cathodes are disposed against one anode, a plurality of cylindrical cathodes having different diameters can be arranged coaxially around a center of the anode or a plurality of flat cathodes can be arranged vertically at proper distances against the anode. Furthermore, when a longitudinally extended electrolytic cell is employed, a plurality of flat cathodes can be arranged horizontally at proper distances against the anode.

Now, typical cells used in the present invention will be explained, referring to the accompanying drawings:

FIG. 1 is a schematic cross-sectional side view of an electrolytic cell wherein an anode is in direct contact with a liquid food to be decolorized.

FIG. 2 is a schematic cross-sectional view of an electrolytic cell wherein an anode is isolated from a liquid food by means of a partition wall.

FIG. 3b is a schematic cross-sectional side view of the electrolytic cell shown in FIG. 3a.

Figure 3A:
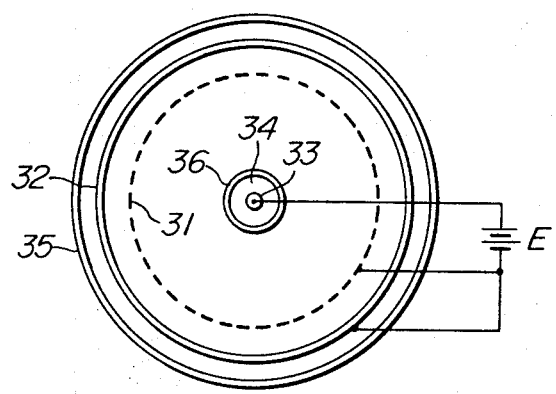
FIG. 3a is a schematic plane view of an electrolytic cell using an anode isolated from a liquid food by a partition wall and a double cathode.

In FIG. 1, numeral 11 is three cathodes consisting of metallic nets or perforated plates and surrounding an anode 12 consisting of carbon. The cathodes 11 and the anode 12 are placed in a vessel 13. The plus and minus symbols represent the positivity and negativity of the electrodes, respectively. A liquid food is placed in the vessel 13. A current density can be made uniform by providing a resistor between three cathodes, though the resistor is not shown in the drawing.

In FIG. 2, cathodes 21 having the same structure as in FIG. 1 surround an anode 22, which is isolated from a liquid food by an isolating membrane 25 consisting of a ceramic tube, and a stopper (26), whereby an anode chamber 23 is formed. The anode 22, the anode chamber 23 and the cathodes 21 are placed in a vessel 24, in which the liquid food is placed. The electrolyte solution is placed in the anode chamber 23. The plus and minus symbols represent the positivity and negativity of the electrodes, respectively. A current density can be made uniform by providing a resistor between the cathodes.

Figure 3B:
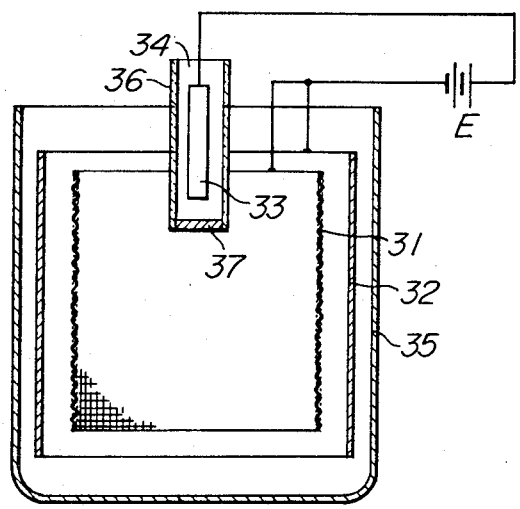

In FIGS. 3a and 3b, a double cathode consists of a cylindrical metallic net or perforated plate 31 and a cylindrical metal plate 32 positioned outside the cylindrical net or perforated plate 31 coaxially at an anode 33. The anode 33 is isolated from a liquid food by an isolating membrane consisting of a ceramic tube 36 and a stopper 37 to form an anode chamber 34. The anode 33, the anode chamber 34 and the double cathode are placed in a vessel 35, in which the liquid food is placed. An electrolyte solution is placed in the anode chamber 34. The symbol E represents a direct current electric source.

Figure 4:
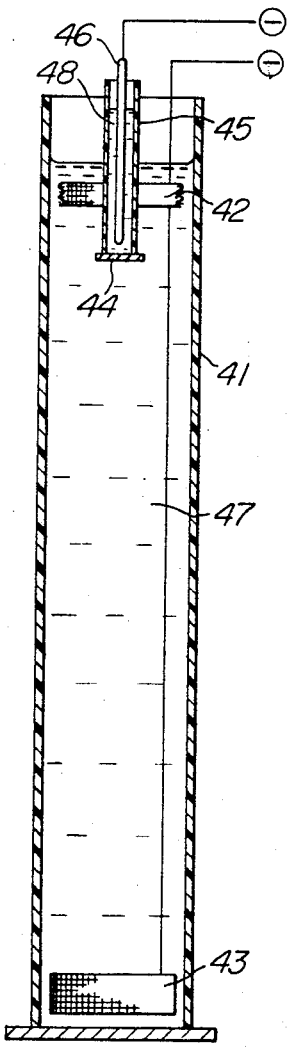
FIG. 4 is a schematic cross-sectional side view of one embodiment of an electrolytic cell employed with reference to Example 15, which follows.

In FIG. 4, a carbon rod anode 46 is isolated from raw soy sauce 47 filled in a polyvinyl chloride cylindrical container 41 having a dimension of 200 mm $\phi$ × 1,200 mm height by an ion-permeable anode chamber consisting a polyvinyl chloride cylinder having a diameter of 20 mm $\phi$ and an ion-permeable ceramic disc stopper having a diameter of 25 mm $\phi$ at the bottom of the cylinder. An aluminum net, ring form cathode 42 having a size of 190 mm $\phi$ and 15 mm height and another aluminum net, ring form cathode 43 having a size of 190 mm $\phi$ and 75 mm height are placed in the container 41.

Raw soy sauce 47 and a saturated NaCl solution 48 are placed in the container 41 and the anode chamber, respectively. The plus and minus symbols represent the positivity and negativity of the electrodes, respectively.

Now, the present invention will be explained, referring to examples, but should not be construed as limitative to these examples.

In examples, the color intensity is determined as follows:

For the soy sauce and amino acid solutions, a tenfold diluted solution is prepared and an absorbancy of a 10-mm solution layer is measured with a light having a wavelength of 500 m$\mu$.

For the concentrated apple juice and "Mirin," the absorbancy of a 10-mm solution layer without any dilution is measured with a light having a wavelength of 500 m$\mu$.

A saturated NaCl solution is used as an anolyte when raw soy sauce, amino acid solution and "Mirin" are used, unless otherwise specified.

EXAMPLE 1

A 42 mm × 225 mm silver net [mesh size (center-to-center): 0.6 mm] was used as a cathode, a carbon rod as an anode, a 100-ml test tube as a cathode chamber, a 50-ml beaker as an anode chamber. A saturated potassium chloride solution was placed in the anode chamber, and the cathode chamber and the anode chamber were connected to each other with a potassium chloride-saturated agar bridge, whereby an electrolytic cell was formed. In the electrolytic cell, 100 ml of raw soy sauce was placed and a direct current was passed between these electrodes under a potential of 3.3 V, and the liquid temperature was kept at 50°C. Reduction was continued for about 6 hours was a current of 22 mA, whereby the decolorization was effected as shown below:

Absorbancy before the reduction: 0.419
Absorbancy after the reduction: 0.361

EXAMPLE 2

Electrolytic reduction was conducted at the normal temperature for 16 hours under a potential of 3.3 V with a current of 18 mA, using the same cell and soy sauce as in Example 1.

The absorbancy of the reduced soy sauce was formed to be 0.329, and the decolorization was satisfactorily effected, as compared with the absorbancy before the reduction of 0.419.

EXAMPLE 3

Raw soy sauce was decolorized, using the same electrolytic cell as in Example 1, except that a copper plate having an entire surface area of 200 cm$^2$ was as a cathode. The potential and the current were 1.7 V and 4 mA, respectively. The reduction was conducted at the normal temperature for 7 hours.

Absorbancy before the reduction: 0.426
Absorbancy after the reduction: 0.374

EXAMPLE 4 of

A spirally wound aluminum plate having an entire surface area of 0.27 m$^2$ was used as a cathode, a carbon rod as an anode, a 3-l beaker as a cathode chamber and an isolating membrane of ceramic tube as an anode chamber, whereby an electrolytic cell as shown in FIG. 2 was formed. In the cell, 3 l of raw soy sauce was placed and subjected to reduction at the normal temperature under a potential of 3 V with a current of 5.3 mA for 43 hours.

Absorbancy before the reduction: 0.433
Absorbancy after the reduction: 0.325

EXAMPLE 5

An iron plate having an entire surface area of 475 cm$^2$ was used as a cathode, a carbon rod as an anode, a 100-ml beaker as a cathode chamber, and a polyvinyl chloride having an ion-permeable ceramic disc as an anode chamber, whereby an electrolytic cell, was formed. In the cell, about 100 ml of raw soy sauce was placed and subjected to reduction at 27°C under a potential of 5 V with a current of 19 mA for 4 hours.

Absorbancy before the reduction: 0.440
Absorbancy after the reduction: 0.361
The decolorization was satisfactorily effected.

EXAMPLE 6

One hundred ml each of pasteurized soy sauce and an amino acid solution (prepared by hydrolysing defatted soy bean with hydrochloric acid) were subjected to reduction, independently, at 50°C under a potential of 4 V with a current of 2.5 mA for 6 hours, using the same electrolytic cell as Example 5, except that an aluminum plate having an entire surface area of 475 cm$^2$ was used as a cathode.

|  | Before reduction | After reduction |
|---|---|---|
| Pasteurized soy sauce | 0.834 | 0.598 |
| Amino acid solution | 0.312 | 0.233 |

EXAMPLE 7

About 100 ml of concentrated apple juice was subjected to reduction at the normal temperature under a potential of 3 V with a current of 1.2 mA for 38 hours, using the same apparatus as in Example 5, except that an aluminum plate having an entire surface area of 240 cm$^2$ was used as a cathode and an aqueous saturated citric acid solution was used as an anolyte solution.

Absorbancy before the reduction: 0.694
Absorbancy after the reduction: 0.234

EXAMPLE 8

One hundred colored "Shiro-Mirin" bottled and stored in a house for about 3 years was subjected to electrolytic reduction at the ordinary temperature under a potential of 3.3 V with a current of 0.4 mA for about 16 hours, using the same cell as in Example 7, except that an aqueous saturated sodium chloride solution was used as an anolyte solution.

Absorbancy before the reduction: 0.199
Absorbancy after the reduction: 0.123
Decolorization was considerably effected.

EXAMPLE 9

In an electrolytic cell consisting of a cathode chamber of a 6-l polyvinyl chloride vessel, an iron rod anode having a size of 20 mm $\phi$ and 200 mm length, a spirally wound iron plate cathode having an entire surface area of 0.3 m$^2$ and an anode chamber using a KCl-saturated agar bridge was placed 5.2 l of raw soy sauce, and the soy sauce was subjected to reduction at the normal temperature under a potential of 20 V with a current of about 110 mA (value obtained one hour after the start of current passage) for about 20 hours, while gently stirring the soy sauce by means of a magnetic stirrer.

Absorbancy before the reduction: 0.419
Absorbancy after the reduction: 0.238

EXAMPLE 10

In an electrolytic cell consisting of a cathode chamber of 2-l beaker, an iron rod anode having a size of 20 mm $\phi$ and 200 mm length, an iron plate cathode having an entire surface area of 0.13 m$^2$, an aqueous saturated citric acid anolyte solution and an anode chamber of KCl-saturated agar bridge, 2 l of concentrated apple juice was placed and subjected to reduction at the ordinary temperature under a potential of 20 V with a current of 50 mA (value obtained 1 hour after the start of the current passage) for about 20 hours.

Absorbancy before the reduction: 0.454
Absorbancy after the reduction: 0.324

EXAMPLE 11

In an electrolytic cell consisting of a cathode chamber of 55-ml test tube, an aluminum plate anode having a size of 20 mm × 300 mm, a multiplily folded aluminum foil cathode having an entire surface area of 200 cm$^2$ and an anode chamber of KCl-saturated agar bridge, 50 ml each of raw soy sauce was placed and subjected to reduction. The current and absorbancy of the decolorized soy sauce were measured, while varying the voltages applied between the two electrodes. The result is given in the following table. The current was passed for 15 hours at the ordinary temperature. The absorbancy before the reduction was 0.451.

| Voltage (V) | Current (mA) | Absorbancy |
| --- | --- | --- |
| 0.2 | 0.006 | 0.338 |
| 0.4 | 0.02 | 0.319 |
| 0.6 | 0.055 | 0.270 |
| 0.8 | 0.2 | 0.227 |
| 1.0 | 1.15 | 0.207 |
| 1.2 | 2.7 | 0.188 |
| 1.4 | 3.6 | 0.180 |
| 1.6 | 4.5 | 0.172 |
| 1.8 | 5.9 | 0.167 |
| 2.0 | 8.9 | 0.160 |

EXAMPLE 12

In an electrolytic cell as shown in FIG. 1 and consisting of a cathode chamber of 2-l beaker, an aluminum net cathode having a size of 170 mm × 380 mm [mesh size (center-to-center): 4 mm], and a carbon rod anode, 2 l of raw soy sauce was placed and subjected to reduction at room temperature under a potential of 2.5 V with a current of 100 mA/l for 16 hours, while gently stirring the soy sauce with a magnetic stirrer.

Absorbancy before the reduction: 0.367
Absorbancy after the reduction: 0.244

EXAMPLE 13

Two l of concentrated fresh apple juice was subjected to reduction at room temperature under a potential of about 4 V with a current of 25 mA/l for 16 hours, using the same cell as in Example 12, while gently stirring the juice with a magnetic stirrer.

Absorbancy before the reduction: 0.949
Absorbancy after the reduction: 0.716

EXAMPLE 14

In an electrolytic cell as shown in FIG. 1 and consisting of a cathode chamber of 1-l graduated cylinder, a Pb-amalgam cathode having an entire surface area of 0.13 m$^2$, and a carbon rod anode, 1 l of raw soy sauce was placed, and after the pH of the soy sauce had been adjusted to 6.5 with $Na_2CO_3$, reduction was carried out at room temperature under a potential of 2.75 V with a current of 200 mA/l for 24 hours. Then, the pH was adjusted to 4.8 (original value) with hydrochloric acid.

Absorbancy before the reduction: 0.372
Absorbancy after the reduction: 0.141

The amounts of increased color intensity per hour of the original soy sauce and the reduced soy sauce were compared by heating these two solutions to 80°C, and was found to be 0.08 for the original solution and 0.05 for the reduced solution, respectively.

EXAMPLE 15

Thirty seven l of raw soy sauce was subjected to reduction with a current of 18 mA for 74 days, using the cell shown in FIG. 4. The average liquid temperature was 27°C, because the ambient temperature was high. The pH of the solution was 5.0 after the electrolysis was completed, and was adjusted to 4.80 (the original value) by adding concentrated HCl thereto.

Absorbancy before the reduction: 0.351
Absorbancy after the reduction: 0.371
The absorbancy of soy sauce preserved for the same days without any reduction was 0.553.

EXAMPLE 16

In an electrolytic cell as shown in FIGS. 3a and 3b and consisting of a carbon rod anode, a cathode chamber of 2-l beaker, an inside aluminum cylindrical net cathode having a size of 160 mm × 290 mm [mesh size (center-to-center): 4 mm] an outside aluminum cylindrical net cathode having a size of 170 mm × 380 mm (the same mesh size as that of the inside net cathode), and an anode chamber of ceramic tube membrane, 2 l of raw soy sauce was placed and subjected to reduction at the normal temperature under a potential of 2.0 V with a current of 100 mA/l. After the completion of the reduction, the pH of soy sauce was adjusted to the original pH by adding HCl thereto. Then, the soy sauce was heated to 80°C for 3 hours, cooled and subjected to a sensory evaluation test.

| reduction time (hr.) | | absorbancy | sensory evaluation test average ranking |
|---|---|---|---|
| 0 | raw soy sauce | 0.345 | flavor 2.3 |
|   | pasteurized soy sauce | 0.784 | taste 2.2 |
| 3 | raw soy sauce | 0.259 | flavor 2.5 |
|   | pasteurized soy sauce | 0.684 | taste 2.2 |
| 6 | raw soy sauce | 0.227 | flavor 2.4 |
|   | pasteurized soy sauce | 0.688 | taste 2.7 |
| 9 | raw soy sauce | 0.186 | flavor 2.7 |
|   | pasteurized soy sauce | 0.642 | taste 2.4 |

Number of panel members is 12 for the taste test and 14 for the flavor test, and total square is 114 for the taste test and 25 for the flavor test, respectively, and it was found that there are no significant differences as regards both taste and flavor.

EXAMPLE 17

In an electrolytic cell A as shown in FIGS. 3a and 3b and consisting of an outside aluminum plate cathode having an entire surface area of 0.13 m², an inside aluminum net cathode having a size of 160 mm × 290 mm [mesh size (center-to-center): 4.0 mm], a carbon rod anode, a cathode chamber of 2-l beaker, and an anode chamber of ceramic tube and an electrolytic cell B having the same structure as the cell A except that a spirally wound aluminum plate having an entire surface area equal to the entire surface area of the outside cathode and the inside cathode (wherein the surface area of the inside cathode is calculated as a plate) was used as a cathode, 2 l each of soy sauce was placed and subjected to electrolytic reduction at the normal temperature under a potential of about 2.2 V with a current of about 45 mA for 17 hours, while gently stirring the soy sauce.

| | |
|---|---|
| Absorbancy before the reduction: | 0.345 |
| Absorbancy after the reduction: | |
| Spirally wound cathode: | 0.205 |
| Net cathode: | 0.169 |

The use of aluminum net cathode was very effective in reduction efficiency under the same conditions of current and reduction time.

EXAMPLE 18

Two l each of concentrated apple juice was subjected to reduction at the normal temperature under a potential of 4.5 V with a current of 100 mA for 17 hours, using the same two cells as in Example 17 and a saturated citric acid solution as the anolyte solution.

| | |
|---|---|
| Absorbancy before the reduction: | 0.854 |
| Absorbancy after the reduction: | |
| Spirally wound cathode: | 0.620 |
| Net cathode: | 0.549 |

What is claimed is:

1. A method for decolorizing melanoidins in a liquid food selected from the group consisting of soy sauce, fruit juices and sake by reduction, which comprises placing a liquid food containing melanoidins in a cathode zone in an electrolytic cell comprising: (1) an anode zone; (2) a cathode zone containing a plurality of cathodes arranged in distances from an anode; and (3) an ion-permeable material placed in contact with and between the anode zone and the cathode zone, placing an electrolyte solution in the anode zone, and applying a direct current to the electrolytic cell under decolorizing conditions of 01–220 mA/l and a reduction rate of 2–2,880 mA · Hr/l to decolor or control formation of or eliminate melanoidins from said liquid food.

2. A method according to claim 1, wherein the decolorization is carried out while gently stirring the liquid food.

3. A method according to claim 1, wherein the cathode zone contains a perforated cathode means.

4. A method according to claim 1, wherein the electrolyte solution is an aqueous chloride solution or an organic acid solution.

5. A method according to claim 1 wherein the melanoidins containing food is soy sauce.

6. A method of claim 1, wherein the voltages applied to the individual cathodes are adjusted thereby to obtain uniform current density on surfaces of the cathodes.

7. A method of decolorizing or controlling formation of or elimination of melanoidins in a liquid food selected from group consisting of soy sauce, fruit juices and sake comprising placing said liquid food in an electrolytic cell having an ion-permeable material as a barrier between an anode zone and a cathode zone, the anode being immersed in an anolyte solution and said anode zone being separated from direct contact with the liquid food and the cathode zone containing a plurality of cathodes at a determined distance from the anode, and applying a current to the electrolytic cell for a period of time effective to decolor or control formation of or eliminate melanoidins from said liquid food.

8. The method of claim 7, wherein the anolyte solution is selected from the group consisting of aqueous chloride solution and aqueous citric acid solution and the anode is a carbon anode and the cathodes are selected from nets or plates of silver, copper, aluminum and iron.

* * * * *